United States Patent [19]
Decker et al.

[11] 3,845,851
[45] Nov. 5, 1974

[54] ARTICLE HANDLING APPARATUS

[75] Inventors: Alfred S. Decker; John R. Duff, both of Toledo; Robert J. Heier, Whitehouse, all of Ohio

[73] Assignee: Owens-Illinois Inc., Toledo, Ohio

[22] Filed: Sept. 9, 1971

[21] Appl. No.: 179,180

Related U.S. Application Data

[63] Continuation of Ser. No. 819,556, May 8, 1969, abandoned.

[52] U.S. Cl. .............................. 198/22 R, 198/28
[51] Int. Cl. .......................................... B65g 47/00
[58] Field of Search ............ 198/22 B, 22 R, 79, 25, 198/102, 28

[56] References Cited
UNITED STATES PATENTS
1,352,718  9/1920  Ayars ................................. 198/22
2,936,059  5/1960  Hakogi ............................... 198/22
3,469,670  9/1969  Cartwright ..................... 198/22 B
3,523,604  8/1970  Babunovic ......................... 198/79
3,572,490  3/1971  Babunovic ......................... 198/22

FOREIGN PATENTS OR APPLICATIONS
854,436  11/1960  Great Britain ..................... 198/25

Primary Examiner—Richard E. Aegerter
Attorney, Agent, or Firm—J. R. Nelson

[57] ABSTRACT

An article handling apparatus comprising two conveyors which are trained over sprockets having a common axis but different diameters. Article engaging means on the conveyor are provided so that the article engaging means of one conveyor are aligned with the article engaging means of the other conveyor as they pass over the sprockets. A guide bar transfers articles from the article engaging means of one conveyor to the article engaging means of the other conveyor.

6 Claims, 4 Drawing Figures

ARTICLE HANDLING APPARATUS

This is a continuation of application Ser. No. 819,556, filed May 8, 1969, now abandoned.

This invention relates to article handling means.

BACKGROUND OF THE INVENTION

In the handling of articles such as glass containers and the like, it is often desirable because of different operations that are performed on the containers to combine two or more lines of containers into a single line or divide a single line of containers into two or more lines. Further in the handling of such containers, it is often desirable to change the linear spacing between a line of containers.

Among the objects of the invention are to provide a method and apparatus for combining two or more lines of containers or dividing a single line of containers into two or more lines with a control of the linear spacing of the containers; which positively controls the position of the containers at all times; which does not require acceleration or auxiliary drive devices; wherein synchronization at the points of combining or dividing is not affected by wear; and wherein there is no container-to-container contact during the combining or dividing.

SUMMARY OF THE INVENTION

An article handling apparatus comprising two conveyors which are trained over sprockets having a common axis but different diameters. Article engaging means on the conveyor are provided so that the article engaging means of one conveyor are aligned with the article engaging means of the other conveyor as they pass over the sprockets. A guide bar transfers articles from the article engaging means of one conveyor to the article engaging means of the other conveyor.

DESCRIPTION

Figure 1:
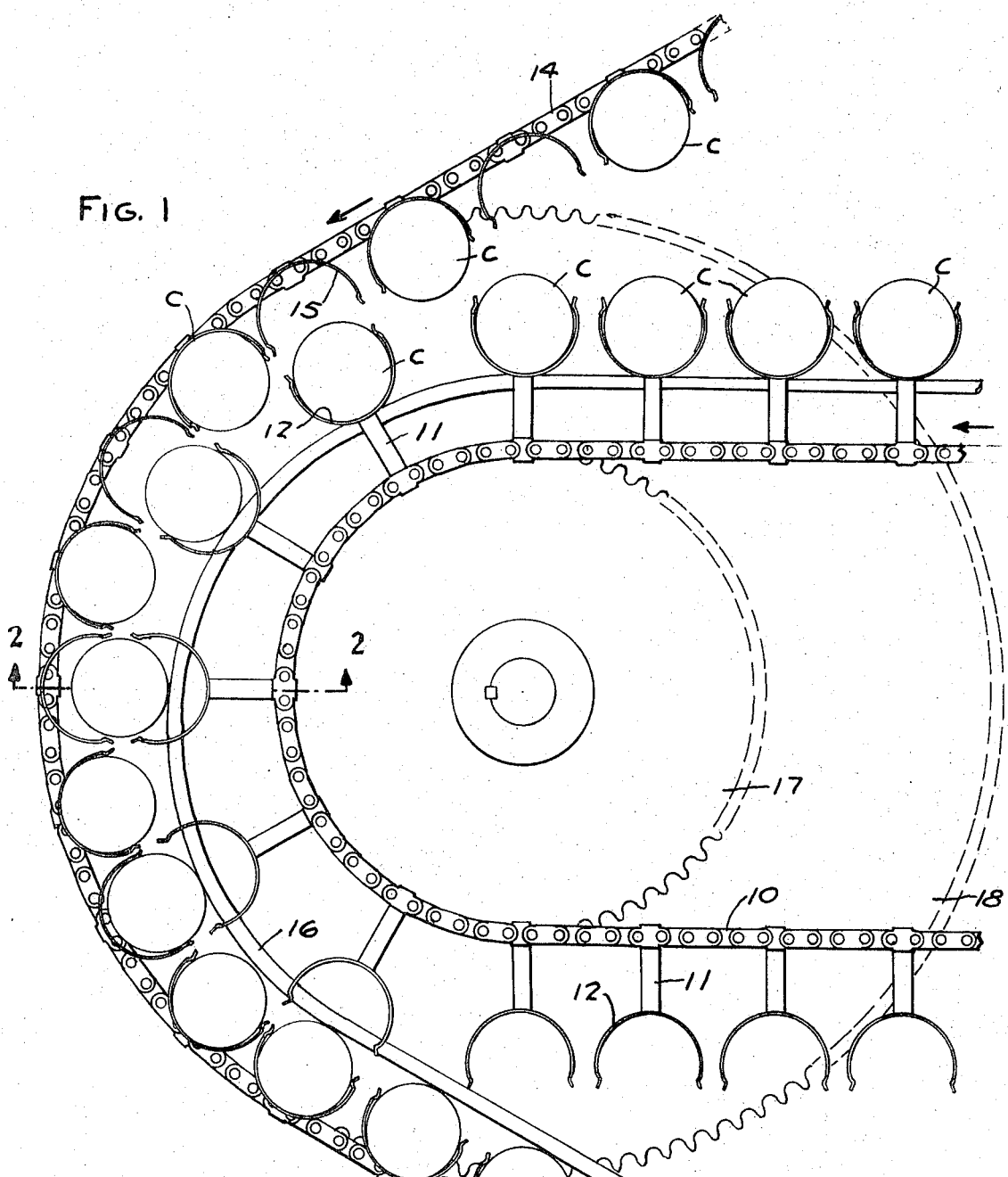
FIG. 1 is a plan view of an apparatus embodying the invention.
Figure 2:
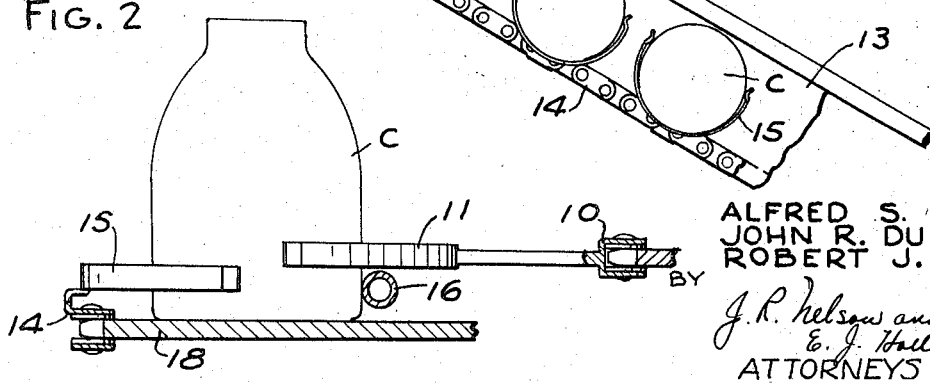
FIG. 2 is a fragmentary sectional view on an enlarged scale taken along the line 2—2 in FIG. 1.

Referring to FIG. 1, the apparatus shown comprises a first conveyor 10 in the form of a chain which has article engaging means 11 thereon, in the form of C-shaped spring members 12, which frictionally engage the circular containers C and move them along a table 13.

The apparatus further comprises a conveyor 14 in the form of a chain conveyor having article engaging means 15, in the form of C-shaped spring members, that also engage containers C and move them along the table 13.

In accordance with the invention the conveyors 10, 14 are moved in a portion of their path through a constant angular velocity and the articles are transferred from one conveyor to the other by a guide bar 16 which cams containers C from the pockets formed by one set of article engaging means to the other. This is achieved by training the conveyors 10, 14 over sprockets 17, 18 which have a common axis of rotation and a common pitch but different diameters. By this arrangement the article engaging means 12 of conveyor 10 are aligned with alternate article engaging members 15 of the conveyor 14.

If the conveyors are moved in the direction of the arrow as shown in FIG. 1 and articles are in the article engaging members 12, the guide members 16 will transfer the articles to alternate article engaging members 15 of conveyor 14.

If the direction of rotation remains the same but the articles are originally positioned in the article engaging members 15 of conveyor 14, the guide member can be positioned to transfer the articles from the conveyor 14 to the conveyor 10.

Figure 3:
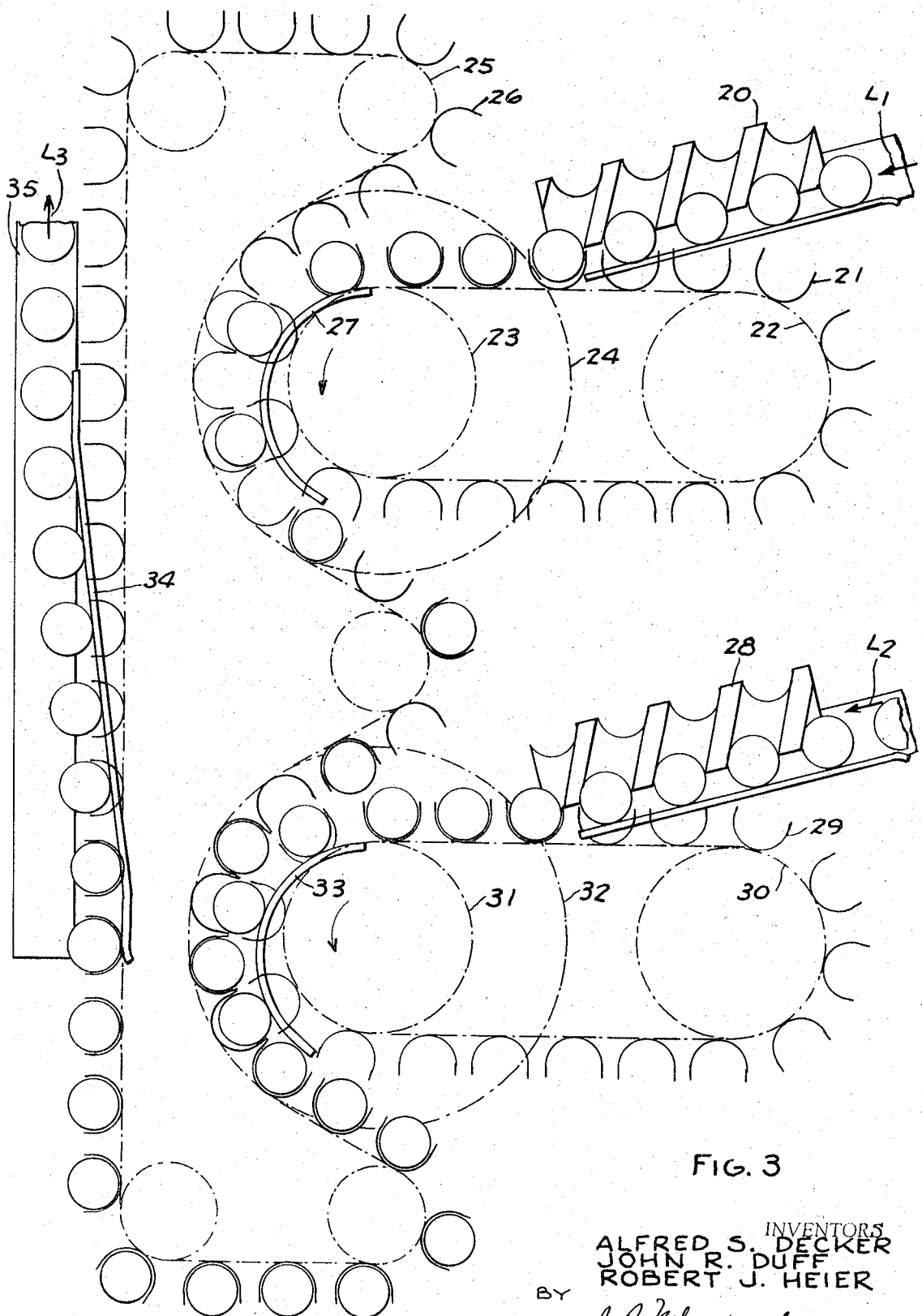
FIG. 3 is a diagrammatic view showing the manner in which an apparatus may be utilized to divide single line of containers into two or more lines.

The manner in which conveyors can be utilized to combine containers from several lines to a single line may be shown by reference to the diagrammatic view FIG. 3. In this view containers C from a line $L_1$ and a line $L_2$ are combined into a single line $L_3$ by utilization of two transfer apparatuses similar to that shown in FIG. 1. The containers from line $L_1$ are fed by a worm spacer 20 into the article engaging members 21 of a conveyor 22. Conveyor 22 is trained over a sprocket 23 which has a common axis with a larger sprocket 24 over which a conveyor 25 having article engaging members 26 is trained. In the arcuate path of the sprockets 23, 24 wherein the conveyors 22, 25 have a constant angular velocity, guide bar 27 transfers containers C from the article engaging members 21 of conveyor 22 to alternate article engaging members 26 of conveyor 25.

The containers C from the second line $L_2$ are spaced longitudinally by worm spacer 28 into the article engaging members 29 of a third conveyor 30 that is trained over a sprocket 31 having a common axis with a sprocket 32 of larger diameter. The conveyor 25 is trained over the sprocket 32 and as the conveyors 30, 25 move over their respective sprockets 31, 32 at a substantially constant angular velocity, a guide bar 33 transfers the containers C from the conveyor 30 to the remaining alternately empty article engaging members 26 of conveyor 25. In this manner all of the article engaging members 26 of the conveyor 25 are filled with containers C. At a subsequent point a transfer bar 34 cams the containers out of the article engaging members 26 onto a conveyor 35 and they will be longitudinally spaced at a predetermined spacing in a single line.

Figure 4:
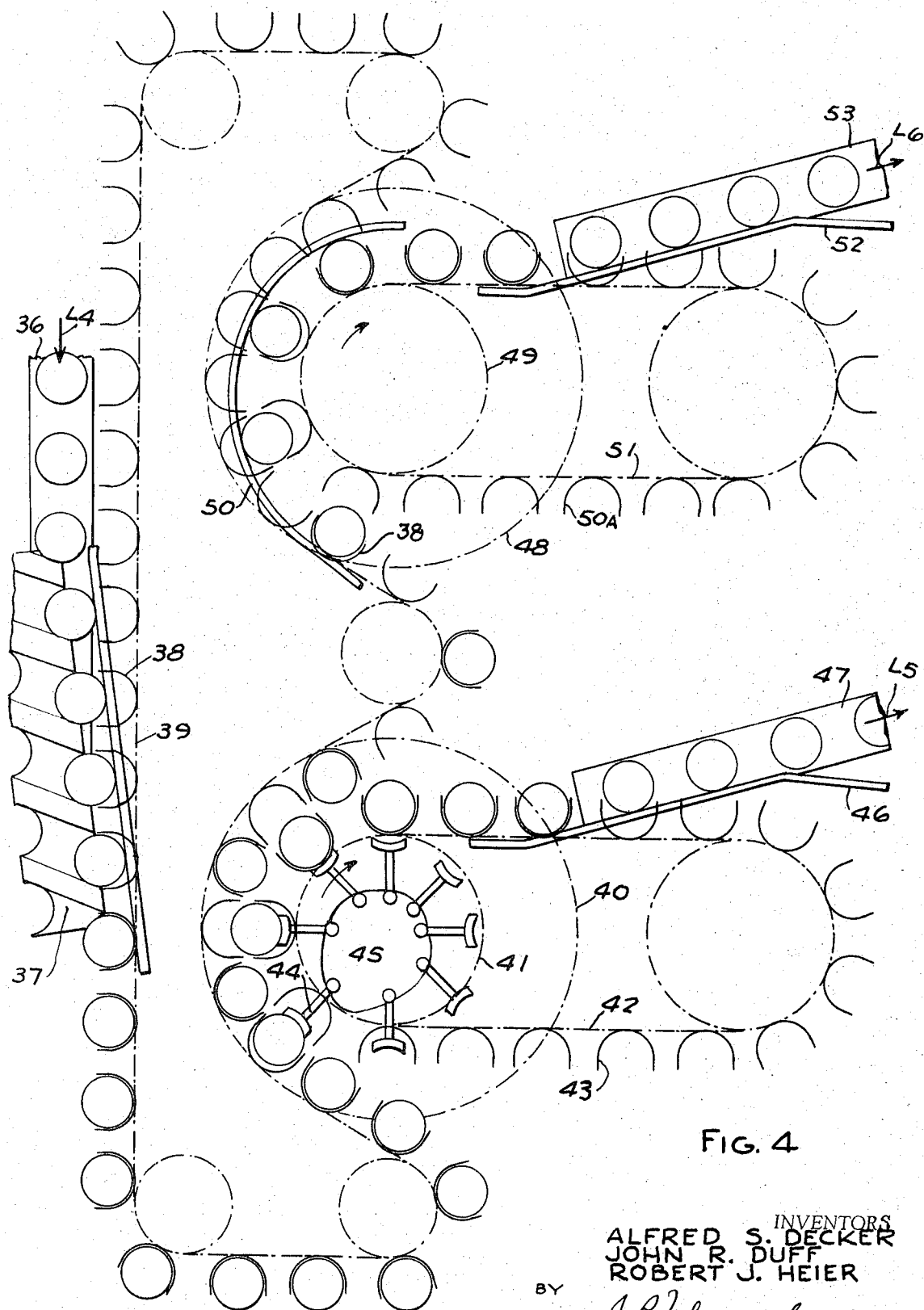
FIG. 4 is a diagrammatic view showing the manner in which the apparatus may be used to combine two or more lines of containers into a single line.

The manner in which the invention may be utilized to divide containers C from a single line into two or more lines is shown by reference to the diagrammatic view FIG. 4 wherein containers from the line $L_4$ are to be divided into lines $L_5$ and $L_6$. As shown the containers from an endless conveyor 36 are transferred by worm spacer 37 into the article engaging members 38 of a conveyor 39. The conveyor 39 is trained over a sprocket 40 which has a common axis with a sprocket 41 of lesser diameter over which conveyor 42 having article engaging members 43 is trained. In the portion wherein the conveyors 39, 42 are trained over their respective sprockets 40, 41 suction members 44 draw the articles out of the article engaging members 38 into the article engaging members 43. As shown the suction members 44 are rotatably mounted and urged radially outwardly against an eccentric fixed cam 45. In this manner alternate containers are drawn from the conveyor 39 onto the conveyor 42. The alternate containers or articles can then be transferred by a transfer bar 46 onto an endless conveyor 47 in linear spaced relationship. Conveyor 39 then passes over a sprocket 48 which has a common axis with sprocket 49 and guide bar 50 transfers the remaining containers C from the article engaging members 38 to article engaging members 50A of the conveyor 51 which is trained over sprocket 49 of lesser diameter. The articles from conveyor 51 are then transferred by a transfer bar 52 onto an endless conveyor 53 in linear spaced relationship.

We claim:

1. In an article handling system, the combination comprising
   a first conveyor having longitudinally spaced article engaging means thereon,
   a second conveyor having longitudinally spaced article engaging means thereon,
   the longitudinal spacing of said article engaging means on said first conveyor differing from the longitudinal spacing of said article engaging means on said second conveyor,
   means for guiding said first conveyor through a first arcuate path,
   means for guiding said second conveyor in a second arcuate path having a different radius than said first arcuate path, portions of said arcuate path being parallel to one another whereby some of the article engaging means on one of said conveyors are radially aligned with some of the article engaging means on the other of said conveyors,
   guide rail means defining a guide surface extending between the conveyors at said arcuate path portions for engaging and forcing articles radially between the article engaging means of one of said conveyors and the article engaging means of the other of said conveyors at their said arcuate path portions,
   support means beneath the articles for supporting them during transfer between said first and second conveyors,
   said means for guiding said first and second conveyors about arcuate paths comprising a pair of rotary members rotatably mounted about a common axis,
   one of said rotary members having a different diameter than the other,
   said conveyors each being trained over one of the rotary members of said pair of members,
   and one of said rotary members providing said support means beneath the articles for supporting them as they are being transferred between the first and second conveyors,
   said article engaging means comprising generally C-shaped members,
   said article engaging means of said first conveyor and said second conveyor having their open ends extending toward one another in said arcuate portions,
   said means for guiding articles from one conveyor to the other comprising a guide rail positioned for forcing articles laterally from the article engaging means of one conveyor to the article engaging means of the other conveyor.

2. The combination set forth in claim 1 wherein said guide means transfers said articles from the conveyor having a larger diameter arcuate path to the conveyor having a lesser diameter arcuate path.

3. The combination set forth in claim 1 wherein said means for guiding said articles transfers articles from said conveyor having a lesser diameter arcuate path to said conveyor having a rotary member of a greater diameter arcuate path.

4. The combination set forth in claim 1 further characterized by:
   a third conveyor having generally C-shaped article engaging members thereon,
   the longitudinal spacing of said article engaging members on said third conveyor differing from the longitudinal spacing of said article engaging members on said first conveyor,
   means for guiding said first conveyor through a third arcuate path spaced from said first arcuate path,
   means for guiding said third conveyor in a fourth arcuate path substantially parallel to said third arcuate path and at substantially the same velocity as said first conveyor such that at least some of the article engaging members on said third conveyor are radially aligned with article engaging members on said first conveyor,
   said means for guiding said first and third conveyors about said third and fourth arcuate paths, respectively, comprising a second pair of rotary members rotatably mounted on a common axis, one of said rotary members of said second pair having a different diameter than the other of said second pair,
   and means guiding articles radially between the article engaging members of the third conveyor and the first conveyor in said third and fourth arcuate paths, comprising a guide rail positioned between said first and third conveyors for forcing articles from the article engaging members of the one conveyor to the article engaging members of the other conveyor,
   and one of said rotary members of said second pair thereof providing a support means beneath the articles for supporting them as they are being transferred between the third and first conveyors in said third and fourth arcuate paths.

5. The combination set forth in claim 4, wherein one of said guide means for guiding said articles is positioned to transfer articles from the conveyor trained over the rotary member of said second pair thereof having a larger diameter to the conveyor trained over a rotary member of said pair having a lesser diameter.

6. The combination set forth in claim 4 wherein one of said means for guiding said articles is positioned to transfer articles from said conveyor which is trained over said second pair of rotary members having a lesser diameter to said conveyor having a rotary member of said pair of a greater diameter.

* * * * *